(12) United States Patent
Yun et al.

(10) Patent No.: US 8,111,758 B2
(45) Date of Patent: Feb. 7, 2012

(54) 3D STEREOSCOPIC/MULTIVIEW VIDEO PROCESSING SYSTEM AND ITS METHOD

(75) Inventors: Kug-Jin Yun, Daejeon (KR); Suk-Hee Cho, Daejeon (KR); Yunjung Choi, Daejeon (KR); Jinhwan Lee, Daejeon (KR); Chieteuk Ahn, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 936 days.

(21) Appl. No.: 10/648,169

(22) Filed: Aug. 26, 2003

(65) Prior Publication Data

US 2004/0120396 A1    Jun. 24, 2004

Related U.S. Application Data

(63) Continuation of application No. 10/317,861, filed on Nov. 20, 2002, now abandoned.

(30) Foreign Application Priority Data

Nov. 21, 2001    (KR) .............................. 2001-0072603

(51) Int. Cl.
*H04N 7/12* (2006.01)
*H04N 11/02* (2006.01)
*H04N 11/04* (2006.01)

(52) U.S. Cl. .................... 375/240.28; 348/43; 348/385.1

(58) Field of Classification Search ............. 375/240.28; 348/43, 48

See application file for complete search history.

(56) References Cited

U.S. PATENT DOCUMENTS

| | | | |
|---|---|---|---|
| 6,052,343 A * | 4/2000 | Yamanaka | 369/44.24 |
| 6,055,012 A | 4/2000 | Haskell et al. | |
| 6,252,586 B1 * | 6/2001 | Freeman et al. | 725/136 |
| 6,553,147 B2 * | 4/2003 | Chai et al. | 382/240 |
| 6,574,423 B1 * | 6/2003 | Oshima et al. | 386/111 |
| 6,674,440 B1 * | 1/2004 | Kirkland et al. | 345/503 |

(Continued)

FOREIGN PATENT DOCUMENTS

EP    0796018 A2    9/1997

(Continued)

OTHER PUBLICATIONS

Puri, A. et al.; "Basics of Stereoscopic Video, New Compression Results with MPEG-2 and a Proposal for MPEG-4"; Signal Processing: Image Communication; 1997; pp. 201-234.

*Primary Examiner* — Mehrdad Dastouri
*Assistant Examiner* — Jeremaiah Hallenbeck-Huber
(74) *Attorney, Agent, or Firm* — Blakely, Sokoloff, Taylor & Zafman

(57) ABSTRACT

Disclosed is a stereoscopic/multiview three-dimensional video processing system and its method. In the present invention, stereoscopic/multiview three-dimensional video data having a plurality of images at the same time are coded into a plurality of elementary streams. The plural elementary streams output at the same time are multiplexed according to the user's selected display mode to generate a single elementary stream. After packetization of the single elementary stream continuously generated, information about the stereoscopic/multiview three-dimensional video multiplexing method and the selected display mode information are added to the packet header of the stream. Then the packetized elementary stream is sent to the image reproducer or stored in storage media. The present invention multiplexes the multichannel elementary streams having the same temporal and spatial information, thereby minimizing the overlapping header information, and performs streaming of data suitable for the user's demand and the user system environments.

19 Claims, 11 Drawing Sheets

U.S. PATENT DOCUMENTS

| | | |
|---|---|---|
| 6,760,918 B2 * | 7/2004 | Rodriguez et al. ............ 725/134 |
| 6,907,067 B1 | 6/2005 | Moeller et al. |
| 7,035,453 B2 * | 4/2006 | Liu ................................ 382/154 |
| 2002/0071616 A1 * | 6/2002 | Yoshida ........................ 382/305 |

FOREIGN PATENT DOCUMENTS

| | | |
|---|---|---|
| EP | 0883300 A2 | 12/1998 |
| EP | 0888018 A1 | 12/1998 |
| EP | 0969676 A2 | 1/2000 |
| EP | 1 122 713 | 8/2001 |
| JP | 5-30538 | 2/1993 |
| JP | 10023427 | 1/1998 |
| JP | 11-018085 | 1/1999 |
| JP | 2000-209580 | 7/2000 |
| JP | 2001-78181 | 3/2001 |
| JP | 2001-312741 | 11/2001 |
| JP | 2003-111101 | 4/2003 |
| WO | WO-97/32437 | 4/1997 |
| WO | WO 00/14966 | 3/2000 |
| WO | WO-00/21299 | 4/2000 |

* cited by examiner

FIG.2

| Es DATA | AU LENGTH |
| DATA LENGTH | DECODING TIME STAMP |
| IDLE FLAG | COMPOSITION TIME STAMP |
| OCR | PRIORITY |
| AU START FLAG | |
| AU END FLAG | |

FIG.12

Syntax

Bit(8) Num Viewpoint;
Bit(2) 2D_2DDispFlag;

Semantics

NumViewpoint: Represents the number of viewpoints of a video image.

2D_3DDispFlag: Determines the display mode for a 3D video image.

FIG.14

| Stream type value | Stream type description |
|---|---|
| 0x00 | Forbidden |
| 0x01 | ObjectDescriptorStream(see 1.5) |
| 0x02 | ClockReferenceStream(see ISO/IEC 4496-1 10.2.5) |
| 0x03 | SceneDescriptionStream(see ISO/IEC 14496-1.9.2.1) |
| 0x04 | VisualStream |
| 0x05 | AudioStream |
| 0x06 | MPEG7Stream |
| 0x07 | IPMPStream(see 1.3.2) |
| 0x08 | ObjectContentInfoStream(see 1.4.2) |
| 0x09 | MPEGJStream |
| 0x0A-0x1F | Reserver for ISO use |
| 0x20-0x3F | User private |

FIG.15

| Stream type value | Stream type description |
|---|---|
| User private | 3D_VisualStream |

3D STEREOSCOPIC/MULTIVIEW VIDEO PROCESSING SYSTEM AND ITS METHOD

The present patent application is a Continuation of Application Ser. No. 10/317,861, filed Nov. 20, 2002 now abandoned.

BACKGROUND OF THE INVENTION

1. Field of the Invention

The present invention relates to a three-dimensional (3D) video processing system and its method. More specifically, the present invention relates to an apparatus and method for processing stereoscopic/multiview three-dimensional video images based on MPEG-4 (Motion Picture Experts Group-4).

2. Description of the Related Art

MPEG is an information transmission method through video image compression and code representation and has been developed to the next-generation compression method, MPEG-7, subsequent to the current MPEG-1/2/4.

MPEG-4, i.e., the video streaming standard for freely storing multimedia data including video images in digital storage media on the Internet is now in common use and is applicable to a portable webcasting MPEG-4 player (PWMP), etc.

More specifically, MPEG-4 is the standard for general multimedia including still pictures, computer graphics (CG), audio coding of analytical composition systems, composite audio based on the musical instrument data interface (MIDI), and text, by adding compression coding of the existing video and audio signals.

Accordingly, the technology of synchronization among objects that are different from one another in attributes as well as the object descriptor representation method for representing the attributes of the individual objects and the scene description information representation method for representing the temporal and spatial correlations among the objects is a matter of great importance.

In the MPEG-4 system, media objects are coded and transferred in the form of an elementary stream (ES), which is characterized by variables determining a maximum transmission rate on the network, QoS (Quality of Service) factors, and necessary decoder resources. The individual media object is composed of one elementary stream of a particular coding method and is streamed through a hierarchy structure, which comprises a compression layer, a sync layer, and a delivery layer.

The MPEG-4 system packetizes the data stream output from a plurality of encoders per access unit (AU) to process objects of different attributes and freely represents the data stream using the object descriptor information and the scene description information.

However, the existing MPEG-4 system standardizes only two-dimensional (hereinafter referred to as "2D") multimedia data and therefore scarcely concerns the technology for processing stereoscopic/multiview 3D video data.

SUMMARY OF THE INVENTION

It is therefore an object of the present invention to process stereoscopic/multiview three-dimensional video data based on the existing MPEG-4 standards.

It is another object of the present invention to minimize the overlapping header information of packets by multiplexing multi-channel field-based elementary streams having the same temporal and spatial information into a single elementary stream.

It is further another object of the present invention to select data suitable for the user's demand and the user system environments, thereby facilitating the data stream.

In one aspect of the present invention, there is provided a stereoscopic/multiview three-dimensional video processing system, which is to process video images based on MPEG-4, the system including: a compressor for processing input stereoscopic/multiview three-dimensional video data to generate field-based elementary streams of multiple channels, and outputting the multi-channel elementary streams into a single integrated elementary stream; a packetizer for receiving the elementary streams from the compressor per access unit and packetizing the received elementary streams; and a transmitter for processing the packetized stereoscopic/multiview three-dimensional video data and transferring or storing the processed video data.

The compressor includes: a three-dimensional object encoder for coding the input stereoscopic/multiview three-dimensional video data to output multi-channel field-based elementary streams; and a three-dimensional elementary stream mixer for integrating the multi-channel field-based elementary streams into a single elementary stream.

The three-dimensional object encoder outputs elementary streams in the unit of 4-channel fields including odd and even fields of a left image and odd and even fields of a right image, when the input data are three-dimensional stereoscopic video data. Alternatively, the three-dimensional object encoder outputs N×2 field-based elementary streams to the three-dimensional elementary stream mixer, when the input data are N-view multiview video data.

The three-dimensional elementary stream mixer generates a single elementary stream by selectively using a plurality of elementary streams input through multiple channels according to a display mode for stereoscopic/multiview three-dimensional video data selected by a user. The display mode is any one mode selected from a two-dimensional video display mode, a three-dimensional video field shuttering display mode for displaying three-dimensional video images by field-based shuttering, a three-dimensional stereoscopic video frame shuttering display mode for displaying three-dimensional video images by frame-based shuttering, and a multiview three-dimensional video display mode for sequentially displaying images at a required frame rate.

The three-dimensional elementary stream mixer multiplexes 4-channel field-based elementary streams of stereoscopic three-dimensional video data output from the three-dimensional object encoder into a single-channel access unit stream using 2-channel elementary streams in the order of the odd field elementary stream of a left image and the even field elementary stream of a right image, when the display mode is the three-dimensional video field shuttering display mode.

The three-dimensional elementary stream mixer multiplexes 4-channel field-based elementary streams of stereoscopic three-dimensional video output from the three-dimensional object encoder into a single-channel access unit stream using 4-channel elementary streams in the order of the odd field elementary stream of a left image, the even field elementary stream of the left image, the odd field elementary stream of a right image, and the even field elementary stream of the right image, when the display mode is the three-dimensional video frame shuttering display mode.

The three-dimensional elementary stream mixer multiplexes 4-channel field-based elementary streams of stereoscopic three-dimensional video output from the three-dimensional object encoder into a single-channel access unit stream using 2-channel elementary streams in the order of the odd field elementary stream of a left image and the even field elementary stream of the left image, when the display mode is the two-dimensional video display mode.

The three-dimensional elementary stream mixer multiplexes N×2 field-based elementary streams of N-view video output from the three-dimensional object encoder into a single-channel access unit stream sequentially using the individual viewpoints in the order of odd field elementary streams and even field elementary streams by viewpoints, when the display mode is the three-dimensional multiview video display mode.

When processing the elementary streams into a single-channel access unit stream and sending them to the packetizer, the compressor sends the individual elementary stream to the packetizer by adding at least one of image discrimination information representing whether the elementary stream is two- or three-dimensional video data, display discrimination information representing the display mode of the stereoscopic/multiview three-dimensional video selected by a user, and viewpoint information representing the number of viewpoints of a corresponding video image that is a multiview video image.

Hence, the packetizer receives a single-channel stream from the compressor per access unit, packetizes the received single-channel stream, and then constructs a packet header based on the additional information. Preferably, the packet header includes an access unit start flag representing which byte of a packet payload is the start of the stream, an access unit end flag representing which byte of the packet payload is the end of the stream, an image discrimination flag representing whether the elementary stream output from the compressor is two- or three-dimensional video data, a decoding time stamp flag, a composition time stamp flag, a viewpoint information flag representing the number of viewpoints of the video image, and a display discrimination flag representing the display mode.

In another aspect of the present invention, there is provided a stereoscopic/multiview three-dimensional video processing method that includes: (a) receiving three-dimensional video data, determining whether a corresponding video image is a stereoscopic or multiview video image, and processing the corresponding video data according to the determination result to generate multi-channel field-based elementary streams; (b) multiplexing the multi-channel field-based elementary streams in a display mode selected by a user to output a single-channel elementary stream; (c) packetizing the single-channel elementary stream received; and (d) processing the packetized stereoscopic/multiview three-dimensional video image and sending or storing the processed video image.

The step (a) of generating the elementary streams includes: outputting elementary streams in the unit of 4-channel fields including odd and even fields of a left three-dimensional stereoscopic image and odd and even fields of a right three-dimensional stereoscopic image, when the input data are three-dimensional stereoscopic video data; and outputting N×2 field-based elementary streams, when the input data are N-view multiview video data.

The multiplexing step (b) further includes multiplexing 4-channel field-based elementary streams of stereoscopic three-dimensional video into a single-channel access unit stream using 2-channel elementary streams in the order of the odd field elementary streams of a left image and the even field elementary streams of a right image, when the display mode is a three-dimensional video field shuttering display mode.

The multiplexing step (b) further includes multiplexing 4-channel field-based elementary streams of stereoscopic three-dimensional video into a single-channel access unit stream using 4-channel elementary streams in the order of the odd field elementary stream of a left image, the even field elementary stream of the left image, the odd field elementary stream of a right image and the even field elementary stream of the right image, when the display mode is a three-dimensional video frame shuttering display mode.

The multiplexing step (b) further includes multiplexing 4-channel field-based elementary streams of stereoscopic three-dimensional video into a single-channel access unit stream using 2-channel elementary streams in the order of the odd field elementary stream of a left image and the even field elementary stream of the left image, when the display mode is a two-dimensional video display mode.

The multiplexing step (b) further includes multiplexing N×2 field-based elementary streams of N-view video into a single-channel access unit stream sequentially using the individual viewpoints in the order of odd field elementary streams and even field elementary streams by viewpoints, when the display mode is a three-dimensional multiview video display mode.

The multiplexing step (b) includes: processing multiview three-dimensional video images to generate multi-channel elementary streams and using time information acquired from an elementary stream of one channel among the multi-channel elementary streams to acquire synchronization with elementary streams of the other viewpoints, thereby acquiring synchronization among the three-dimensional video images.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is an illustration of information transmitted by ESI for the conventional 2D multimedia;

FIG. 12 is an illustration of additional transfer information for the conventional ESI for processing stereoscopic/multiview 3D video images according to an embodiment of the present invention;

FIG. 14 MPEG-4 is stream types defined by a system; and

FIG. 15 is a 3D video image stream type for processing a stereoscopic/multiview 3D video image by a decoder.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

In the embodiment of the present invention, MPEG-4 stereoscopic/multiview 3D video data are processed. Particularly, the encoded field-based elementary streams output through multiple channels at the same time are integrated into a single-channel elementary stream according to the user's system environments and the user's selected display mode, and then multiplexed into a single 3D access unit stream (hereinafter referred to as "3D_AU stream").

More particularly, the streaming is enabled to support all the four display modes: a two-dimensional video display mode, a three-dimensional video field shuttering display mode for displaying three-dimensional video images by field-based shuttering, a three-dimensional stereoscopic video frame shuttering display mode for displaying three-dimensional video images by frame-based shuttering, and a multiview three-dimensional video display mode for sequentially displaying images at a required frame rate by using a lenticula lens or the like.

To enable the multiplexing of the stereoscopic/multiview 3D video images and the above-mentioned four display defined by the user, the embodiment of the present invention generates new header information of a sync packet header and constructs the header with the overlapping information minimized. Furthermore, the embodiment of the present invention simplifies synchronization among 3D video images by using the time information acquired from one-channel elementary streams among multi-channel elementary streams for multi-view video images at the same time, to acquire synchronization with the elementary streams of the other viewpoints.

Figure 1:
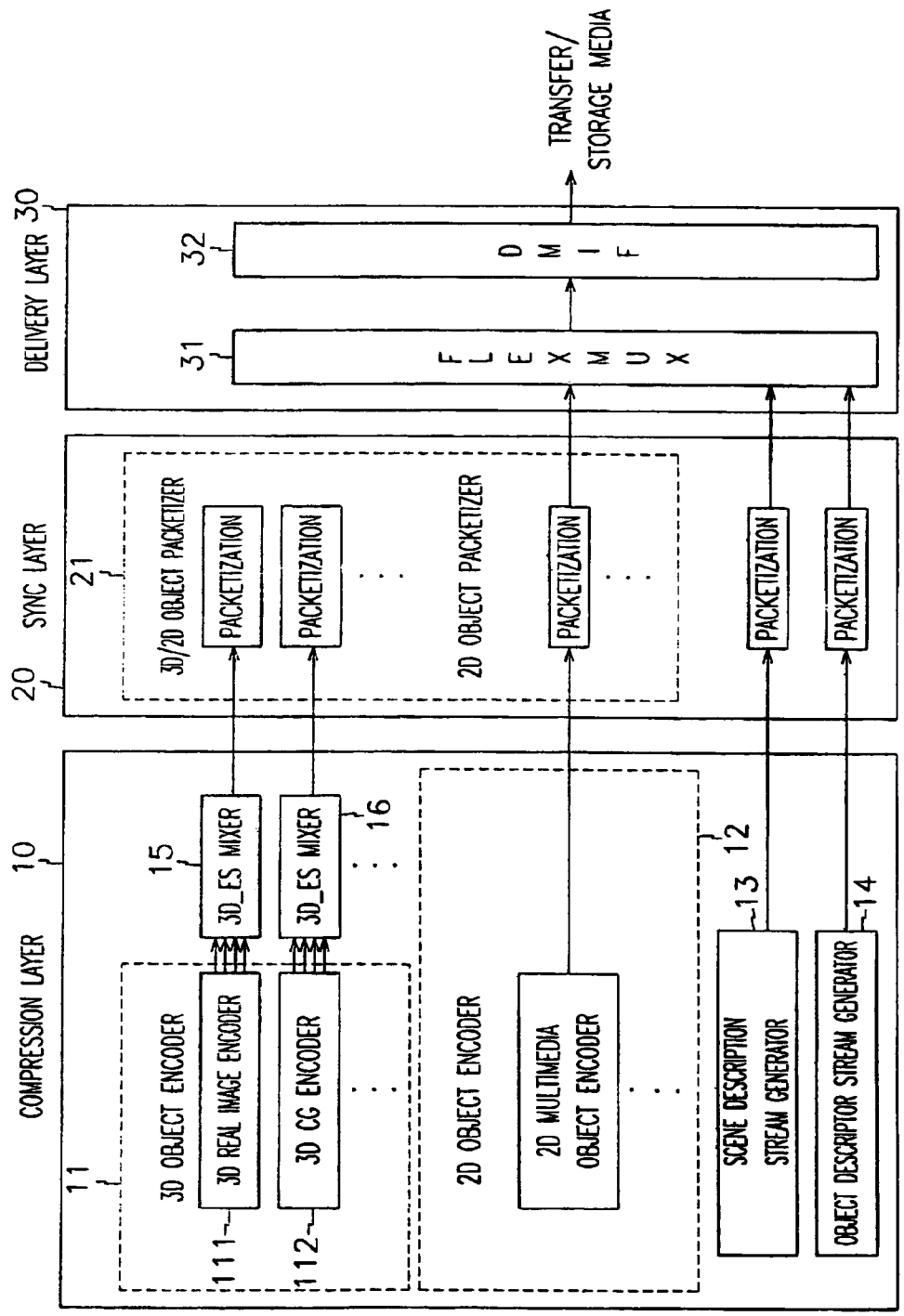
FIG. 1 is a schematic of a stereoscopic/multiview 3D video processing system according to an embodiment of the present invention.

FIG. 1 is a schematic of a stereoscopic/multiview 3D video processing system (hereinafter referred to as "video processing system") according to an embodiment of the present invention.

The video processing system according to the embodiment of the present invention, which is to process stereoscopic/multiview 3D video data based on the MPEG-4 system, comprises, as shown in FIG. 1, a compression layer 10 supporting multiple encoders; a sync layer 20 receiving access unit (AU) data and generating packets suitable for synchronization; and a delivery layer 30 including a FlexMux 31 optionally given for simultaneous multiplexing of multiple streams, and a delivery multimedia integrated framework (DMIF) 32 for constructing interfaces to transport environments and storage media.

The compression layer 10 comprises various object encoders for still pictures, computer graphics (CG), audio coding of analytical composition systems, musical instrument data interface (MIDI), and text, as well as 2D video and audio.

More specifically, the compression layer 10 comprises, as shown in FIG. 1, a 3D object encoder 11, a 2D object encoder 12, a scene description stream generator 13, a object descriptor stream generator 14, and 3D elementary stream mixers (hereinafter referred to as "3D_ES mixers") 15 and 16.

The 2D object encoder 12 encodes various objects including still pictures, computer graphics (CG), audio coding of analytical composition systems, musical instrument data interface (MIDI), and text, as well as 2D video and audio. The elementary stream output from the individual encoders in the 2D object encoder 12 is output in the form of an AU stream and is transferred to the sync layer 20.

The object descriptor stream generator 14 generates an object descriptor stream for representing the attributes of multiple objects, and the scene configuration information stream generator 13 generates a scene description stream for representing the temporal and spatial correlations among the objects.

The 3D object encoder 11 and the 3D_ES mixers 15 and 16 are to process stereoscopic/multiview 3D video images while maintaining compatibility with the existing MPEG-4 system.

The 3D object encoder 11 is an object-based encoder for stereoscopic/multiview 3D video data, and comprises a plurality of 3D real image encoders for processing images actually taken by cameras or the like, and a 3D computer graphic (CG) encoder for processing computer-generated images, i.e., CG.

When the input data are stereoscopic 3D video images generated in different directions, the 3D object encoder 11 outputs elementary streams in the units of even and odd fields of left and right images, respectively. Contrarily, when the input data are N-view 3D video images, the 3D object encoder 11 outputs N×2 field-based elementary streams to the 3D_ES mixers 15 and 16.

The 3D_ES mixers 15 and 16 process the individual elementary streams output from the 3D object encoder 11 into a single 3D_AU stream, and send the single 3D_AU stream to the sync layer 20.

The above-stated single 3D_AU stream output from the compression layer 10 is transferred to the sync layer via an elementary stream interface (ESI). The ESI is an interface connecting media data streams to the sync layer that is not prescribed by the ISO/IEC 14496-1 but is provided for easy realization, and accordingly, can be modified in case of need. The ESI transfers SL packet header information. An example of the SL packet header information transferred through the ESI in the existing MPEG-4 system is illustrated in FIG. 2. The SL packet header information is used for the sync layer 20 generating an SL packet header.

To maintain temporal synchronization between or in the elementary streams, the sync layer 20 comprises a plurality of object packetizers 21 for receiving the individual elementary stream output from the compression layer 10 per AU, dividing it into a plurality of SL packets to generate a payload of individual SL packets and to generate a header of each individual SL packet with reference to information received for every AU via the ESI, thereby completing SL packets composed of the header and the payload.

The SL packet header is used to check continuity in case of data loss and includes information related to a time stamp.

The packet stream output from the sync layer 20 is sent to the delivery layer 30, and is processed into a stream suitable for interfaces to transport environments and storage media via the DIMF 32 after being multiplexed by the FlexMux 31.

The basic processing of the sync layer 20 and the delivery layer 30 is the same as that of the existing MPEG-4 system, and will not be described in detail.

Now, a description will be given as to a method for multiplexing stereoscopic/multiview 3D video images based on the above-constructed video processing system.

As an example, 2D images and multi-channel 3D images (including still or motion pictures) taken by at least two cameras, or computer-generated 3D images, i.e., CG, are fed into the 2D object encoder 12 and the 3D object encoder 11 of the compression layer 10, respectively. The multiplexing process for 2D images is well known to those skilled in the art and will not be described in detail.

The stereoscopic/multiview 3D video images that are real images taken by cameras are input to a 3D real image encoder 111 of the 3D object encoder 11, and the CG as a computer-generated 3D stereoscopic/multiview video image is input to a 3D CG encoder 112 of the 3D object encoder 11.

Figure 3:
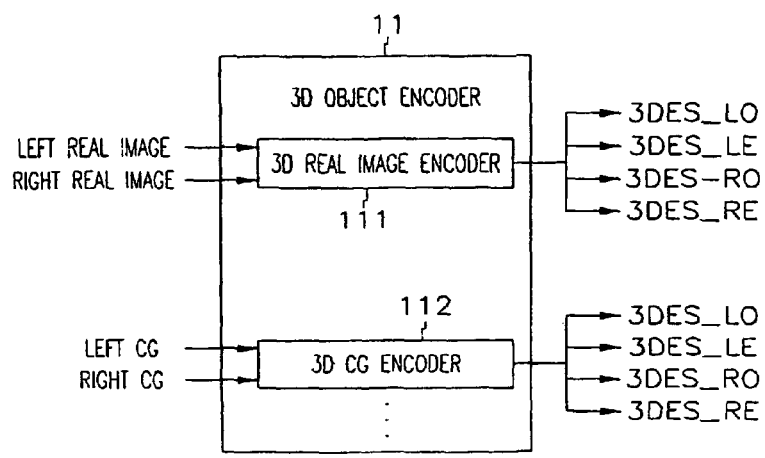
FIG. 3 is an illustration of input/output data of a stereoscopic 3D video encoder according to an embodiment of the present invention.
Figure 4:
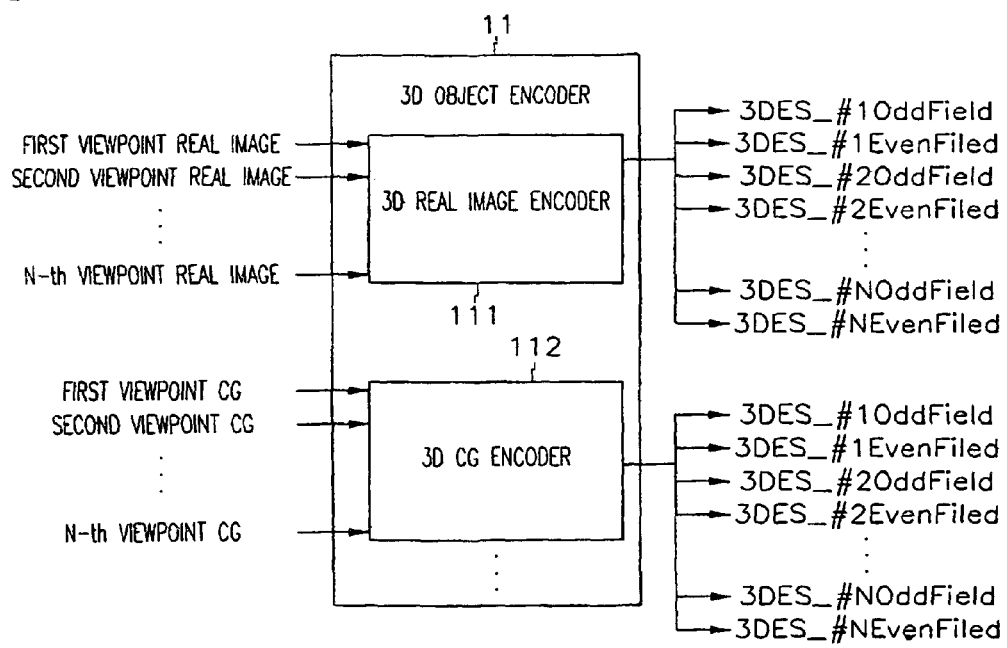
FIG. 4 is an illustration of input/output data of a 3D N-view video encoder according to an embodiment of the present invention.

FIGS. 3 and 4 illustrate the operations of the plural 3D real image encoders and the 3D CG encoder, respectively.

When the input data are a stereoscopic 3D video image generated in the left and right directions, as shown in FIG. 3, the 3D real image encoder 111 or the 3D CG encoder 112 encodes left and right images or left and right CG data in the unit of fields to output elementary streams in the unit of 4-channel fields.

More specifically, the stereoscopic 3D real image or CG is encoded into a stereoscopic 3D elementary stream of left odd fields 3DES_LO, a stereoscopic 3D elementary stream of left even fields 3DES_LE, a stereoscopic 3D elementary stream of right odd fields 3DES_RO, and a stereoscopic 3D elementary stream of right even fields 3DES_RE.

When the input data are an N-view video image, the 3D real image encoder 111 or the 3D CG encoder 112 encodes N-view image or CG data in the unit of fields to output odd field elementary streams of first to N-th viewpoints, and even field elementary streams of first to N-th viewpoints.

More specifically, as shown in FIG. 4, the N-view video is encoded into N×2 elementary streams including an odd field elementary stream of the first viewpoint 3DES_#1 OddField, an odd field elementary stream of the second viewpoint 3DES_#2 OddField, . . . , an odd field elementary stream of the N-th viewpoint 3DES_#N OddField, an even field elementary stream of the first viewpoint 3DES_#1 EvenField, an even field elementary stream of the second viewpoint 3DES_#2 EvenField, . . . , and an even field elementary stream of the N-th viewpoint 3DES_#N EvenField.

As described above, the multi-channel field-based elementary streams output from the stereoscopic/multiview 3D object encoder 11 are input to the 3D_ES mixers 15 and 16 for multiplexing.

Figure 5:
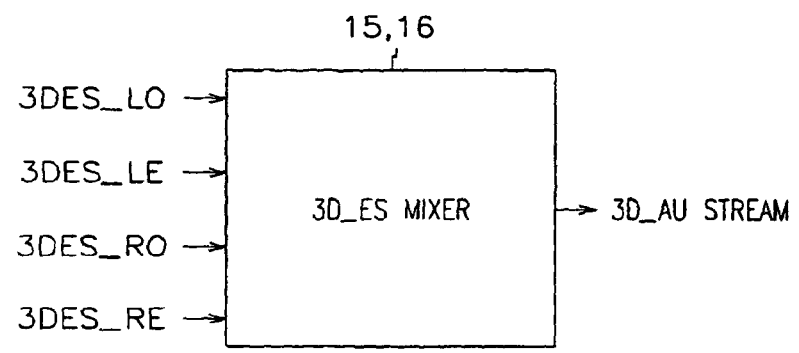
FIG. 5 is an illustration of input/output data of a 3D ES mixer for stereoscopic video according to an embodiment of the present invention.
Figure 6:
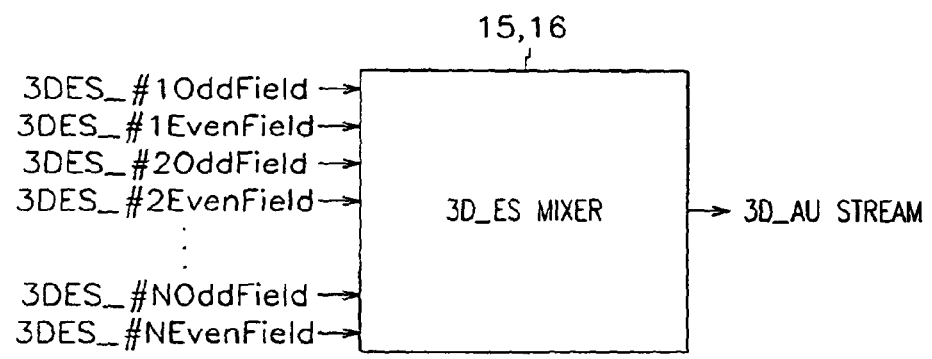
FIG. 6 is an illustration of input/output data of a multi-view 3D ES mixer according to an embodiment of the present invention.

FIGS. 5 and 6 illustrate the multiplexing process of the 3D_ES mixers.

The 3D_ES mixers 15 and 16 multiplex the multi-channel field-based elementary streams into a 3D_AU stream to output a single-channel integrated stream. Here, the elementary stream data to be transferred are variable depending on the display mode. Accordingly, multiplexing is performed to transfer only the necessary elementary streams for the individual display mode.

There are four display modes: a 2D video display mode, a 3D video field shuttering display mode, a 3D video frame shuttering display mode, and a multiview 3D video display mode.

Figure 7:
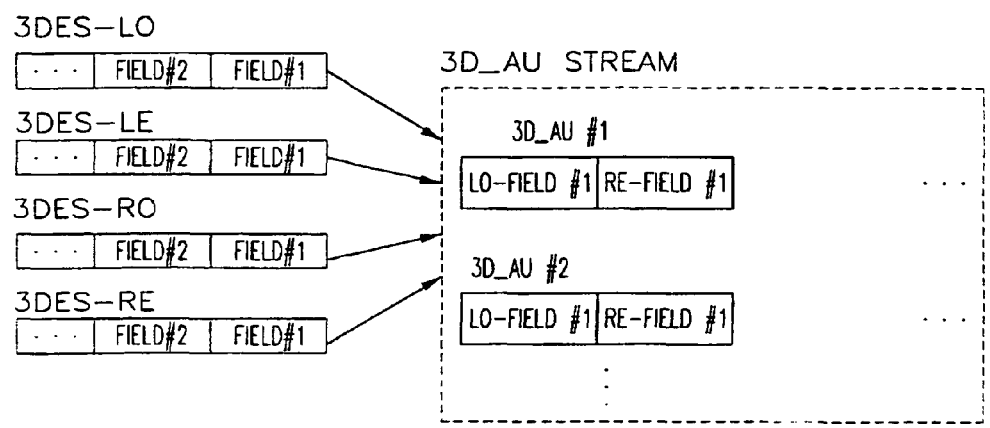
FIG. 7 is a schematic of a field-based ES multiplexer for stereoscopic 3D video images for field shuttering display according to an embodiment of the present invention.
Figure 8:
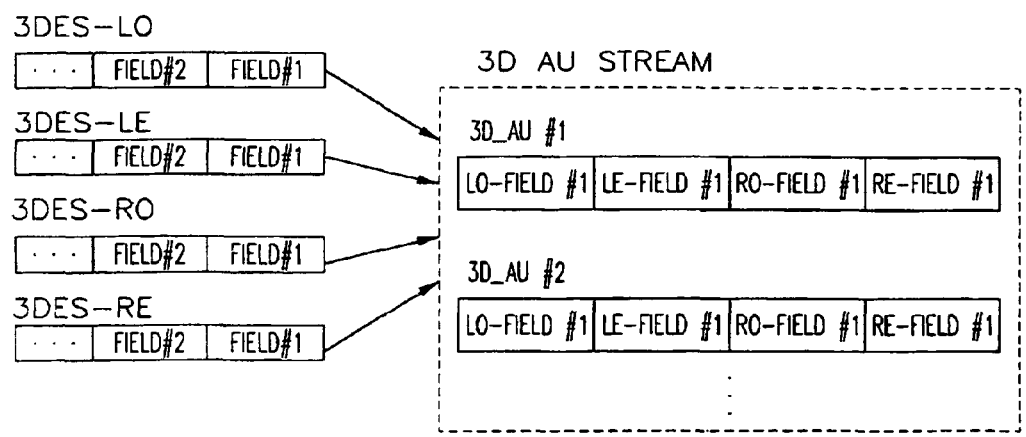
FIG. 8 is a schematic of a field-based ES multiplexer for stereoscopic 3D video images for frame shuttering display according to an embodiment of the present invention.
Figure 9:
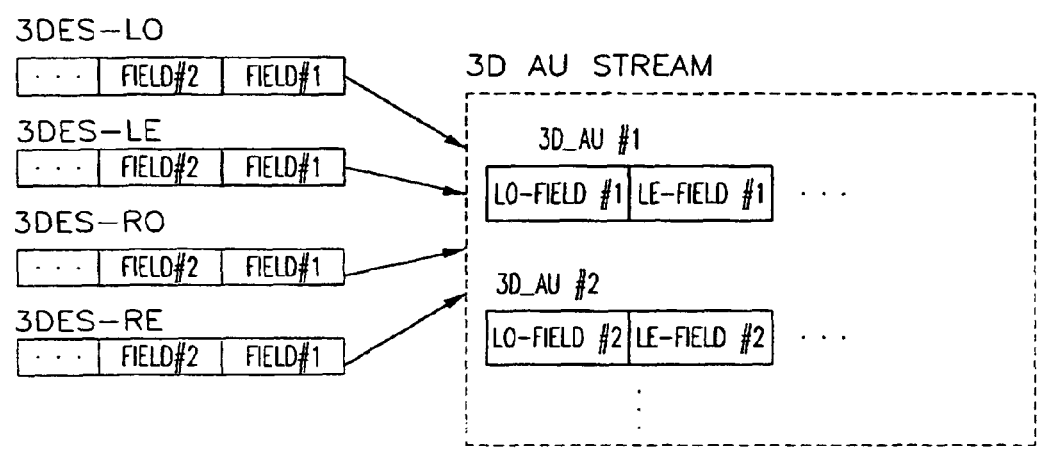
FIG. 9 is a schematic of a field-based ES multiplexer for stereoscopic 3D video images for 2D display according to an embodiment of the present invention.
Figure 10:
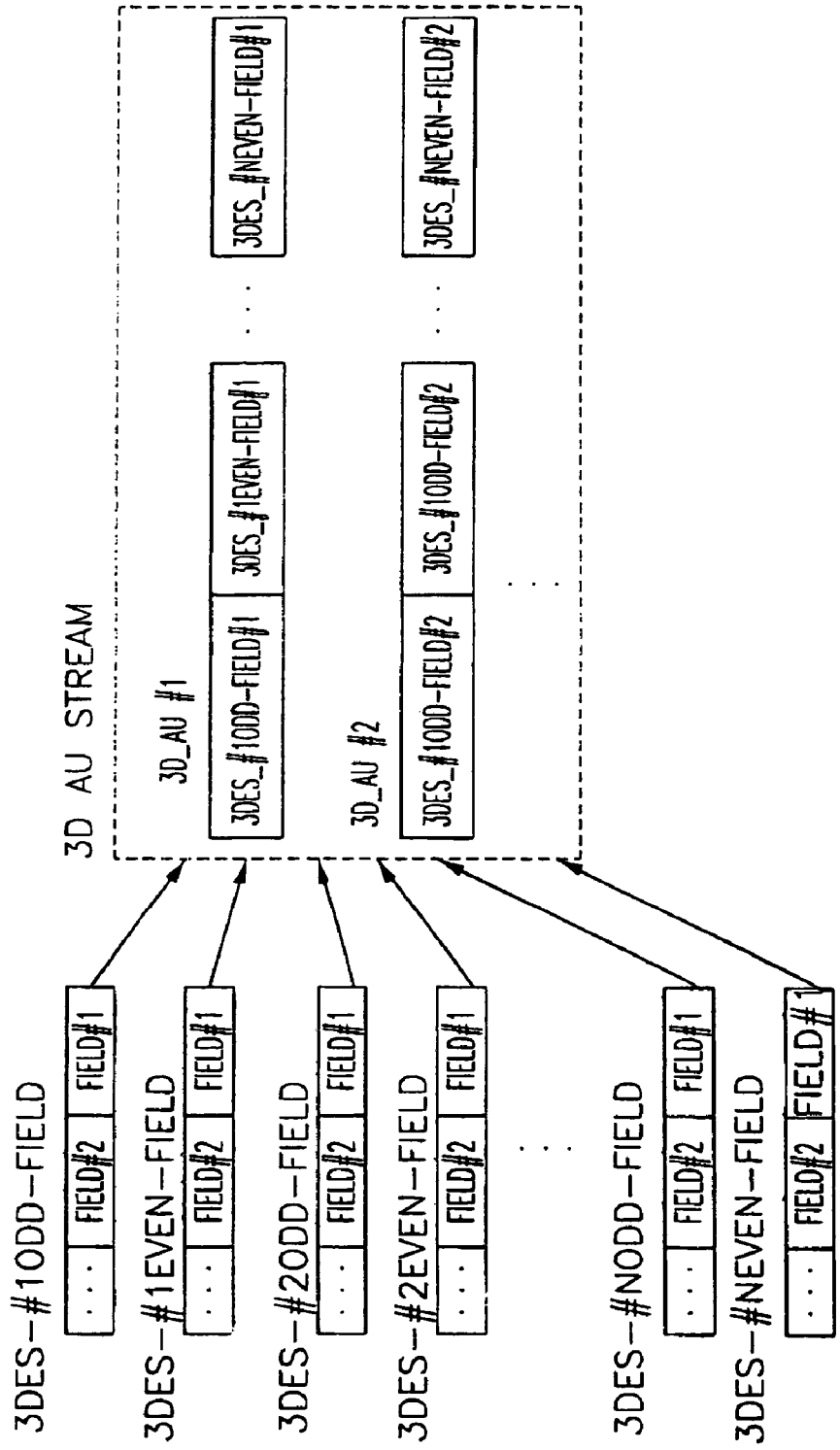
FIG. 10 is a schematic of a field-based ES multiplexer for multiview 3D video images for 3D display according to an embodiment of the present invention.
Figure 11:
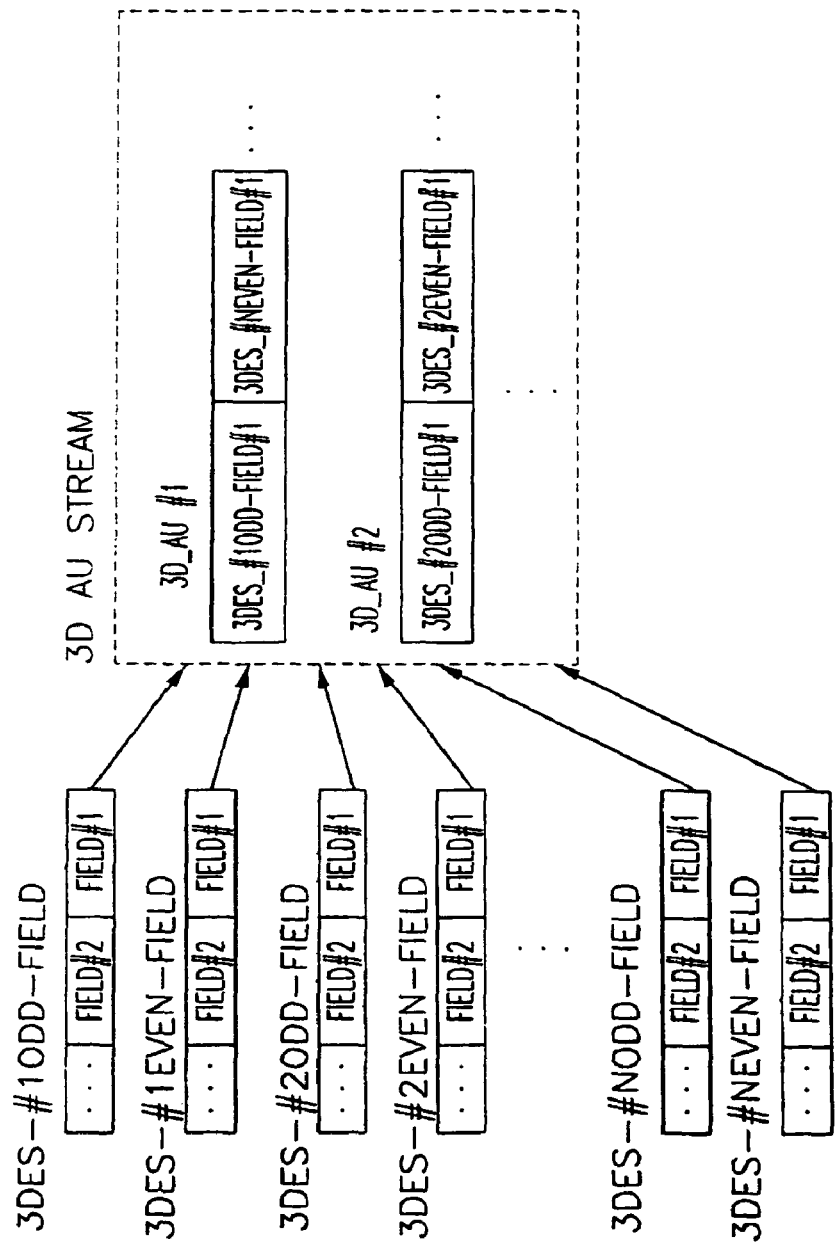
FIG. 11 is a schematic of a field-based ES multiplexer for multiview 3D video images for 2D display according to an embodiment of the present invention.

FIGS. 7 to 11 illustrate multiplexing examples for multi-channel field-based elementary streams depending on the display mode concerned. FIGS. 7, 8, and 9 show multiplexing methods for stereoscopic 3D video data, and FIGS. 10 and 11 show multiplexing method for multiview 3D video data.

When the user selects the 3D video field shuttering display mode for stereoscopic 3D video data, the stereoscopic 3D elementary stream of left odd fields 3DES_LO and the stereoscopic 3D elementary stream of right even fields 3DES_RE among the 4-channel elementary streams output from the 3D object encoder 11 are sequentially integrated into a single-channel 3D_AU stream, as shown in FIG. 7.

When the user selects the 3D video frame shuttering display mode for stereoscopic 3D video data, the stereoscopic 3D elementary stream of left odd fields 3DES_LO, the stereoscopic 3D elementary stream of left even fields 3DES_LE, the stereoscopic 3D elementary stream of right odd fields 3DES_RO, and the stereoscopic 3D elementary stream of right even fields 3DES_RE among the 4-channel elementary streams are sequentially integrated into a single-channel 3D_AU stream, as shown in FIG. 8.

When the user selects the 2D video display mode for stereoscopic 3D video data, the stereoscopic 3D elementary stream of left odd fields 3DES_LO and the stereoscopic 3D elementary stream of left even fields 3DES_LE are sequentially integrated into a single-channel 3D_AU stream, as shown in FIG. 9.

When the user selects the 3D video display mode for multiview 3D video data, the elementary streams are integrated into a single-channel 3D_AU stream in the order of odd and even fields for every viewpoint and then in the order of viewpoints, as shown in FIG. 10. Namely, the elementary streams of a multiview video image are integrated into a single-channel 3D_AU stream in the order of the odd field elementary stream of the first viewpoint 3DES_#1 OddField, the even field elementary stream of the first viewpoint 3DES_#1 EvenField, . . . , the odd field elementary stream of the N-th viewpoint 3DES_#N OddField, and the even field elementary stream of the N-th viewpoint 3DES_#N EvenField.

When the user selects the 2D video display mode for multiview 3D video data, only the odd and even field elementary streams of one viewpoint are sequentially integrated into a single-channel 3D_AU stream, as shown in FIG. 11. Accordingly, the user is enabled to display images of his/her desired viewpoint in the 2D video display mode for multiview 3D video images.

As described above, the single-channel 3D_AU stream output from the 3D_ES mixers 15 and 16 are fed into the sync layer 20. In addition to the information transferred from the ESI, as shown in FIG. 2, the single channel 3D_AU stream includes optional information for stereoscopic/multiview 3D video streaming according to the embodiment of the present invention.

The syntax and semantics of the information added to the stereoscopic/multiview 3D video data are defined in FIG. 12.

FIG. 12 shows the syntax and semantics of the information added to the single 3D_AU stream for stereoscopic/multiview 3D video images, where only the optional information other than the information transferred via the ESI is illustrated.

More specifically, three information sets such as a display discrimination flag 2D_3DDispFlag, and a viewpoint information flag NumViewpoint are additionally given, as shown in FIG. 12.

The display discrimination flag 2D-3DDispFlag represents the display mode for stereoscopic/multiview 3D video chosen by the user. In this embodiment, the display discrimination flag is, if not specifically limited to, "00" for the 2D video display mode, "01" for the 3D video field shuttering display mode, "10" for the 3D video frame shuttering display mode, and "11" for the multiview 3D video display mode.

The viewpoint information flag NumViewpoint represents the number of viewpoints for motion pictures. Namely, the viewpoint information flag is designated as "2" for stereoscopic 3D video data that are video images of two viewpoints, and as "N" for 3D N-view video data that are video images of N viewpoints.

The sync layer 20 receives the input elementary streams per AU, divides it into a plurality of SL packets to generate a payload of the individual SL packets and constructs a sync packet header based on the information transferred via the ESI for every AU, and the above-stated additional information for stereoscopic/multiview 3D video images (i.e., display discrimination flag, and viewpoint information flag).

Figure 13:
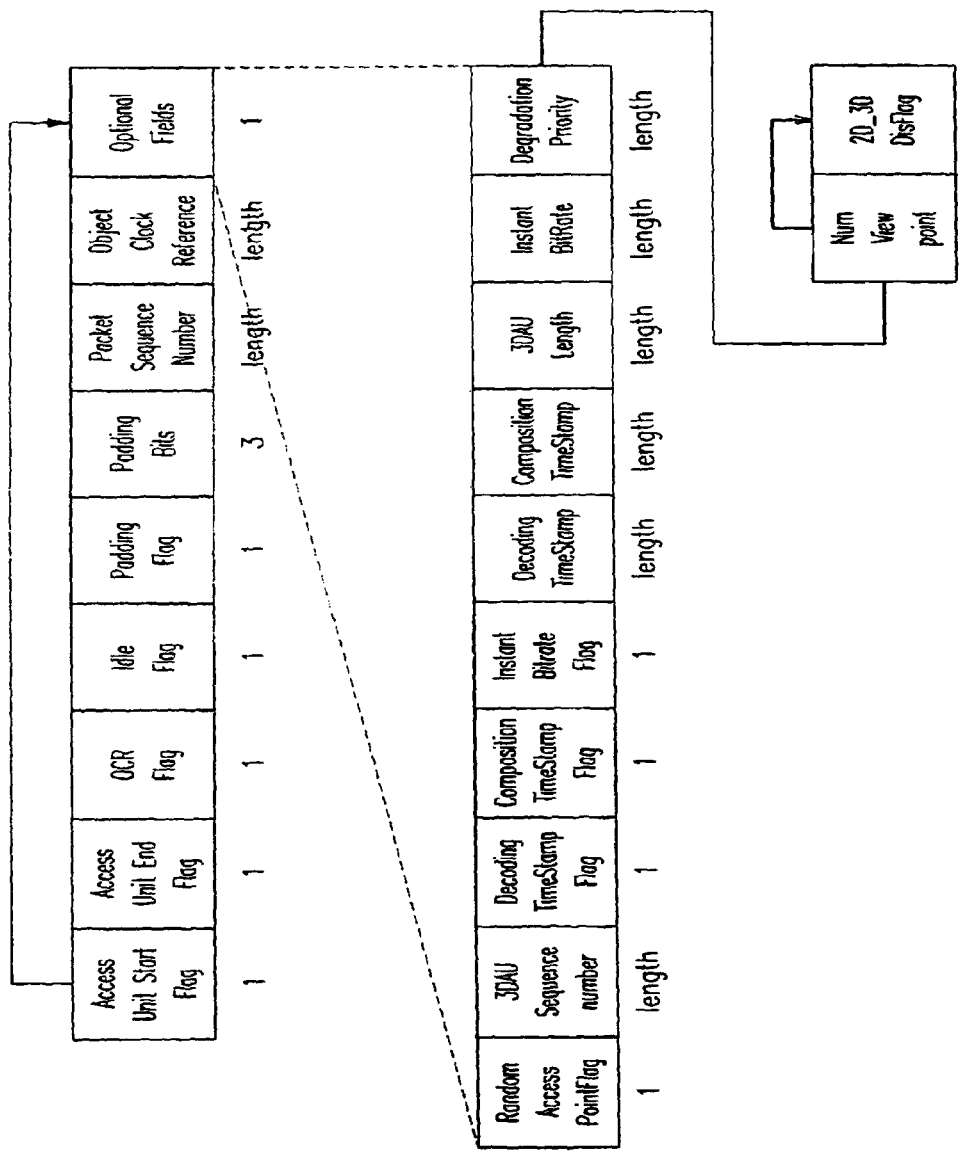
FIG. 13 is a schematic of a sync packet header for processing stereoscopic/multiview 3D video images according to an embodiment of the present invention.

FIG. 13 illustrates the structure of a sync packet header that is header information added to one 3D_AU stream for stereoscopic 3D video data according to an embodiment of the present invention.

In the sync packet header shown in FIG. 13, an access unit start flag AccessUnitStartFlag represents which byte of the sync packet payload is the start of the 3D_AU stream. For example, the flag bit of "1" means that the first byte of the SL packet payload is the start of one 3D_AU stream.

An access unit end flag AccessUnitEndFlag represents which byte of the sync packet payload is the end of the 3D_AU stream. For example, the flag bit of "1" means that the last byte of the SL packet payload is the ending byte of the current 3D_AU stream.

An object clock reference (OCR) flag represents how many object clock references follow. For example, the flag bit of "1" means that one object clock reference follows.

An idle flag IdleFlag represents the output state of the 3D_AU stream. For example, the flag bit of "1" means that 3D_AU data are not output for a predetermined time, and the flag bit of "0" means that 3D_AU data are output.

A padding flag PaddingFlag represents whether or not padding is present in the SL packet. For example, the flag bit of "1" means that padding is present in the SL packet.

The padding bit PaddingBits represents a padding mode to be used for the SL packet and has a default value of "0".

A packet sequence number PacketSequenceNumber has a modulo value continuously increasing for the individual SL packet. Discontinuity in the decoder means a loss of at least one SL packet.

The object clock reference (OCR) includes an OCR time stamp and exists in the SL packet header only when the OCR flag is set.

The flag bit of the access unit start flag AccessUnitStartFlag set to "1" represents that the first byte of the SL packet payload is the start of one 3D_AU, in which case information of the optional fields is transferred.

A random access point flag RandomAccessPointFlag having a flag bit set to "1" represents that random access to contents is enabled.

A 3D_AU sequence number 3D_AUSequenceNumber has a module value continuously increasing for the individual 3D_AU. Discontinuity in the decoder means a loss of at least one 3D_AU.

A decoding time stamp flag DecodingTimeStampFlag represents the presence of a decoding time stamp (DTS) in the SL packet.

A composition time stamp flag CompositionTimeStampFlag represents the presence of a composition time stamp (CTS) in the SL packet.

An instant bit rate flag InstantBitRateFlag represents the presence of an instant bit rate in the SL packet.

A decoding time stamp (DTS) is a DTS present in the related SL configuration descriptor and exists only when the decoding time differs from the composition time for the 3D_AU.

A composition time stamp (CTS) is a CTS present in the related S1 configuration descriptor.

A 3D_AU length represents the byte length of the 3D_AU.

An instant bit rate represents the bit rate for the current 3D_AU, and is effective until the next instant bit rate field appears.

A degradation priority represents the priority of the SL packet payload.

A viewpoint information flag NumViewpoint represents the number of viewpoints of motion pictures. Namely, the viewpoint information flag is set to "2" for stereoscopic 3D video data that are motion pictures of two viewpoints; or the viewpoint information flag is set to "N" for 3D N-view video data.

A display discrimination flag 2D_3DDispFlag represents the display mode for 3D video data in the same manner as the case of stereoscopic 3D video data. In this embodiment, the display discrimination flag is set to "00" for the 2D video display mode, "01" for the 3D video field shuttering display mode, "10" for the 3D video frame shuttering display mode and "11 " for the multiview video display mode.

Once the above-constructed header is built, the sync layer 20 combines the header with the payload to generate an SL packet and sends the SL packet to the delivery layer 30.

After being multiplexed at the FlexMux 31, the SL packet stream transferred to the delivery layer 30 is processed into a stream suitable for an interface to transport environments via the DIMF 32 and sent to a receiver. Alternatively, the SL packet stream is processed into a stream suitable for an interface to storage media and is stored in the storage media.

The receiver decodes the processed packet stream from the video processing system to reproduce the original image.

In this case, the 3D object decoder at the receiver detects the stream format type of the multiplexed 3D_AU so as to restore the 3D video data in the stream format type of each 3D-AU multiplexed. Thus the 3D object decoder performs decoding after detecting the stream format type of the 3D_AU based on the values stored in the viewpoint information flag NumViewpoint and the display discrimination flag 2D_3DDispFlag among the information stored in the header of the packet received.

For example, when the viewpoint information flag NumViewpoint is "2" and the display discrimination flag 2D_3DDispFlag is "00" in the header of the transferred packet stream, stereoscopic 3D video data are to be displayed in the 2D video display mode and the 3D_AU is multiplexed in the order of the 3D elementary stream of left odd fields 3DES_LO and the 3D elementary stream of left even fields 3DES_LE, as shown in FIG. 10.

When the viewpoint information flag NumViewpoint is "2" and the display discrimination flag 2D_3DDispFlag is "01", stereoscopic 3D video data are to be displayed in the 3D video field shuttering display mode and the 3D_AU is multiplexed in the order of the 3D elementary stream of left odd fields 3DES_LO and the 3D elementary stream of right even fields 3DES_RE, as shown in FIG. 8.

Finally, when the viewpoint information flag NumViewpoint is "2" and the display discrimination flag 2D_3DDispFlag is "10", stereoscopic 3D video data are to be displayed in the 3D video frame shuttering display mode and the 3D_AU is multiplexed in the order of the 3D elementary stream of left odd fields 3DES_LO, the 3D elementary stream of left even fields 3DES_LE, and the 3D elementary stream of right even fields 3DES_RE, as shown in FIG. 9.

On the other hand, when the viewpoint information flag NumViewpoint is "2" and the display discrimination flag 2D_3DDispFlag is "11", stereoscopic 3D video data are to be displayed in the multiview 3D video display mode, a case that cannot occur.

When the viewpoint information flag NumViewpoint is "N" and the display discrimination flag 2D_3DDispFlag is "00", multiview 3D video data are to be displayed in the 2D video display mode and the 3D_AU is multiplexed in the order of the odd field elementary stream of the first viewpoint 3DES_#1O and the even field elementary stream of the first viewpoint 3DES_#1E, as shown in FIG. 12.

When the viewpoint information flag NumViewpoint is "N" and the display discrimination flag 2D_3DDispFlag is "11", multiview 3D video data are to be displayed in the multiview 3D video display mode and the 3D_AU is multiplexed in the order of all odd field elementary streams of the first to N-th viewpoints 3DES_#1O, . . . , and 3DES_#NO and all even field elementary streams of the first to N-th viewpoints 3DES_#1E, . . . , and 3DES_#NE, as shown in FIG. 11.

When the viewpoint information flag NumViewpoint is "N" and the display discrimination flag 2D_3DDispFlag is "10" or "01", multiview 3D video data are to be displayed in the 3D video frame/field shuttering display mode, a case that seldom occurs.

As stated above, the receiver checks the stream format type of the 3D_AU multiplexed in the packet stream based on the values stored in the viewpoint information flag NumViewpoint and the display discrimination flag 2D_3DDispFlag of the header of the packet stream transferred from the video processing system according to the embodiment of the present invention, and then performs decoding to reproduce 3D video images.

FIG. 14 shows stream types defined by the DecoderConfigDescriptor of the MPEG-4 system, and FIG. 15 shows a new stream type for determining whether an elementary stream of the stereoscopic 3D video image output from the compression layer is 2D or 3D video image data.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention enables stereoscopic/multiview 3D video processing in the existing MPEG-4 system.

Particularly, the multi-channel field-based elementary streams having the same temporal and spatial information are multiplexed into a single elementary stream, thereby minimizing the overlapping header information.

The present invention also simplifies synchronization among 3D video data by using the time information acquired from the one-channel elementary stream among the multichannel elementary streams for multiview video data at the same time in synchronization with elementary streams of the other viewpoints.

Furthermore, the multiplexing structure and the header construction of the present invention enable the user to selectively display stereoscopic/multiview 3D video data in the 3D video field/frame shuttering display mode, the multiview 3D video display mode, or the 2D video display mode, while maintaining compatibility with the existing 2D video processing system. Hence, the present invention can perform streaming of selected data suitable for the user's demand and system environments.

What is claimed is:

1. A stereoscopic/multiview three-dimensional video processing system, the system comprising:
    a compressor for processing a plurality of video data streams into a plurality of compressed video data streams, and combining the plurality of compressed video data streams into a single integrated elementary stream;
    a packetizer for packetizing the single integrated elementary stream into a packetized elementary stream;
    a multiplexer for multiplexing the packetized elementary stream; and
    a transmitter for outputting the multiplexed stream for transmitting or storing the same, wherein the multiplexed stream includes: viewpoint information including a viewpoint information flag representing a value corresponding to the number of view points that the packetized elementary stream provides; and display discrimination information including a display mode that the packetized elementary stream provides and is selected by a user from a set of display modes prior to the display discrimination information being included in the multiplexed stream, and
    wherein the packetizer constructs a packet and adds header information to the packet to include the viewpoint information and the display discrimination information, the display mode is selected from a plurality of display modes including a two-dimensional video display mode, a stereoscopic three-dimensional video display mode, and a multiview three dimensional video display mode.

2. The system as claimed in claim 1, wherein the plurality of compressed video data streams are multi-channel field based streams.

3. The system as claimed in claim 1, wherein the plurality of compressed video data streams are 4-channel field-based elementary streams including odd and even fields of a left three-dimensional stereoscopic image and odd and even fields of a right three-dimensional stereoscopic image, when the display mode is three-dimensional stereoscopic video.

4. The system as claimed in claim 1, wherein the plurality of compressed video data streams are N×2 field-based elementary streams, when the number of the view points is N.

5. The system as claimed in claim 2, wherein the display discrimination information represents whether the elementary stream is two or three-dimensional video data.

6. A stereoscopic/multiview three-dimensional video processing method, the method comprising:
    processing, by a compressor in a video processing system, a plurality of video data streams into a plurality of compressed video data streams;
    combining, by a mixer, the plurality of compressed video data streams into a single integrated elementary stream;
    packetizing, by a packetizer, the single integrated elementary stream into a packetized elementary stream;
    multiplexing, by a multiplexer, the packetized elementary stream; and
    outputting, by the video processing system, the multiplexed stream for transmitting or storing the same,
    wherein the multiplexed stream includes: viewpoint information including a viewpoint information flag representing a value corresponding to the number of view points that the packetized elementary stream provides;

and display discrimination information including a display mode that the packetized elementary stream provides and is selected by a user from a set of display modes prior to the display discrimination information being included in the multiplexed stream, and wherein packetizing comprises: constructing a packet and adding header information to the packet to include the viewpoint information and the display discrimination information, the display mode is selected from a plurality of display modes including a two- dimensional video display mode, a stereoscopic three-dimensional video display mode, and a multiview three dimensional video display mode.

7. The method as claimed in claim 6, wherein the plurality of compressed video data streams are multi-channel field based streams.

8. The method as claimed in claim 6, wherein the plurality of compressed video data streams are 4-channel field-based elementary streams including odd and even fields of a left three-dimensional stereoscopic image and odd and even fields of a right three-dimensional stereoscopic image, when the display mode is three-dimensional stereoscopic video.

9. The method as claimed in claim 6, wherein the plurality of compressed video data streams are N×2 field-based elementary streams, when the number of the view points is N.

10. A method for decoding a multiplexed video packet stream comprising:
   receiving, by a receiver, the multiplexed packet stream which includes viewpoint information and display discrimination information, wherein the viewpoint information includes a viewpoint information flag representing a value corresponding to the number of viewpoints of motion pictures and the display discrimination information represents a display mode of motion pictures that is selected by a user from a set of display modes prior to the display discrimination information being included in the multiplexed packet stream;
   detecting, by a decoder, the viewpoint information and the display discrimination information from the multiplexed packet stream;
   confirming, by the decoder, a stream format of the multiplexed packet stream and decoding the confirmed packet stream, based on the detected viewpoint information and the detected display discrimination information,
   wherein the multiplexed packet stream includes a plurality of packets, each packet including header information that includes the viewpoint information and the display discrimination information, the display mode is selected from a plurality of display modes including a two-dimensional video display mode, a stereoscopic three-dimensional video display mode, and a multiview three dimensional video display mode.

11. The method as claimed in claim 10, wherein the viewpoint information and the display discrimination information are included in a header of the multiplexed packet stream.

12. The method as claimed in claim 10, wherein when the confirmed stream format is a three-dimensional video field shuttering display mode, the step (c) decodes after confirming that 4-channel field-based elementary streams of stereoscopic three-dimensional video are multiplexed into one or more access unit stream using 2-channel elementary streams in the order of the odd field elementary streams of a left image and the even field elementary streams of a right image.

13. The method as claimed in claim 10, wherein when the confirmed stream format is a three-dimensional video frame shuttering display mode, the step (c) decodes after confirming that 4-channel field-based elementary streams of stereoscopic three-dimensional video are multiplexed into one or more access unit stream using 4-channel elementary streams in the order of the odd field elementary stream of a left image, the even field elementary stream of the left image, the odd field elementary stream of a right image and the even field elementary stream of the right image.

14. The method as claimed in claim 10, wherein when the confirmed stream format is a two-dimensional video display mode, the step (c) decodes after confirming that 4-channel field-based elementary streams of stereoscopic three-dimensional video are multiplexed into one or more access unit stream using 2-channel elementary streams in the order of the odd field elementary stream of a left image and the even field elementary stream of the left image.

15. The method as claimed in claim 10, wherein when the confirmed stream format is a three-dimensional multiview video display mode, the step (c) decodes after confirming that N×2 field-based elementary streams of N-view video are multiplexed into one or more access unit stream sequentially using the individual viewpoints in the order of odd field elementary streams and even field elementary streams by viewpoints.

16. A method for decoding a multiplexed video packet stream, the method comprising:
   receiving, by a receiver, the multiplexed video packet stream having view point information and display discrimination information;
   demultiplexing, by the receiver, and depacketizing the multiplexed video packet stream based on the view point information and the display discrimination information, and thus generating a plurality of compressed video data;
   decompressing, by the receiver, a plurality of video data from the plurality of compressed video data,
   wherein the viewpoint information includes a viewpoint information flag representing a value corresponding to the number of view points that the packetized elementary stream provides and wherein the display discrimination information includes a display mode that the multiplexed video packet stream provides and is selected by a user from a set of display modes prior to the display discrimination information being included in the multiplexed video packet stream, wherein the multiplexed video packet stream includes a plurality of packets, each packet including header information that includes the viewpoint information and the display discrimination information, the display mode is selected from a plurality of display modes including a two-dimensional video display mode, a stereoscopic three-dimensional video display mode, and a multiview three dimensional video display mode.

17. The method as claimed in claim 16, wherein the plurality of compressed video data streams are multi-channel field based streams.

18. The method as claimed in claim 16, wherein the plurality of compressed video data streams are 4-channel field-based elementary streams including odd and even fields of a left three-dimensional stereoscopic image and odd and even fields of a right three-dimensional stereoscopic image, when the display mode is three-dimensional stereoscopic video.

19. The method as claimed in claim 16, wherein the plurality of compressed video data streams are N×2 field-based elementary streams, when the number of the view points is N.

* * * * *